United States Patent
Chen

(10) Patent No.: US 7,991,988 B2
(45) Date of Patent: Aug. 2, 2011

(54) COMMUNICATION DEVICE AND FIRMWARE UPDATE METHOD THEREOF

(75) Inventor: Chien-Hua Chen, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 410 days.

(21) Appl. No.: 12/346,868

(22) Filed: Dec. 31, 2008

(65) Prior Publication Data
US 2009/0222650 A1 Sep. 3, 2009

(30) Foreign Application Priority Data

Feb. 29, 2008 (TW) .............................. 97107096 A

(51) Int. Cl.
| | |
|---|---|
| G06F 9/00 | (2006.01) |
| G06F 15/177 | (2006.01) |
| G06F 3/00 | (2006.01) |
| G06F 13/00 | (2006.01) |
| G06F 13/42 | (2006.01) |
| G06F 12/00 | (2006.01) |
| G06F 11/00 | (2006.01) |
| G06F 9/44 | (2006.01) |
| G06F 9/445 | (2006.01) |
| H04B 1/38 | (2006.01) |
| H04M 3/00 | (2006.01) |

(52) U.S. Cl. ............... 713/1; 713/2; 713/100; 709/220; 710/10; 710/104; 710/105; 711/102; 714/6.1; 714/15; 714/42; 717/171; 717/176; 455/73; 455/418

(58) Field of Classification Search ................... 713/1, 2, 713/100; 709/220; 710/10, 104, 105; 711/102; 714/6.1, 15, 42; 717/171, 176; 455/73, 418
See application file for complete search history.

(56) References Cited

U.S. PATENT DOCUMENTS

| | | | |
|---|---|---|---|
| 6,023,620 A | 2/2000 | Hansson | |
| 6,282,675 B1 * | 8/2001 | Sun et al. | 714/36 |
| 6,442,067 B1 | 8/2002 | Chawla et al. | |
| 6,584,559 B1 * | 6/2003 | Huh et al. | 713/2 |
| 6,640,334 B1 * | 10/2003 | Rasmussen | 717/171 |
| 7,730,326 B2 * | 6/2010 | Girish et al. | 713/191 |
| 2004/0068334 A1 | 4/2004 | Tsai et al. | |
| 2007/0050612 A1 * | 3/2007 | Chen | 713/100 |

FOREIGN PATENT DOCUMENTS

| | | |
|---|---|---|
| CN | 100407638 C | 7/2008 |
| WO | W02004063899 A | 7/2004 |

* cited by examiner

*Primary Examiner* — Stefan Stoynov
(74) *Attorney, Agent, or Firm* — Frank R. Niranjan

(57) ABSTRACT

A method for updating firmware in a communication device storing an original firmware in a first data area of a non-volatile memory includes receiving and storing a new firmware in a second data area of the non-volatile memory. The method comprises assigning a firmware other than the new firmware as a boot firmware for the communication device before verification of the new firmware. The new firmware is loaded and executed in response to a boot procedure of the communication device. If the new firmware is executable and causes the communication device to satisfy a predetermined boot up condition, the new firmware passes the bootability check, and the new firmware is assigned as the boot firmware. The new firmware is not assigned as the boot firmware if the new firmware does not pass the bootability check.

20 Claims, 10 Drawing Sheets

COMMUNICATION DEVICE AND FIRMWARE UPDATE METHOD THEREOF

BACKGROUND

1. Technical Field

The present disclosure relates to firmware, and more particularly to a communication device and method thereof for updating firmware.

2. Description of Related Art

As a firmware image typically stores boot code and hardware configuration data of a communication device, such as a router, a personal digital assistant (PDA), a cellular telephone, the functionality and performance of the firmware greatly affects the functionality of the communication device. This is the reason why firmware development and debugging require a lot of software engineering effort.

Software engineers modify firmware to improve functionality, correct bugs, add new features, or meet market requests of customers. The software engineers regularly release a new firmware version for users to upgrade their device. In upgrading the communication device, a new version of firmware is first received and programmed into a flash memory of the communication device. Due to characteristics of the flash memory, the programming process must not be interrupted; otherwise a whole block of flash memory may be damaged and unworkable.

However, in practice, the programming process may be interrupted by various reasons, such as a sudden power failure. If there is only one firmware stored in the flash memory, any interruption during the programming process may render the communication device unable to reboot and in need of repair. Maintenance staff must then unload and reprogram the flash memory, which can be inconvenient and costly.

DETAILED DESCRIPTION

Figure 1A:
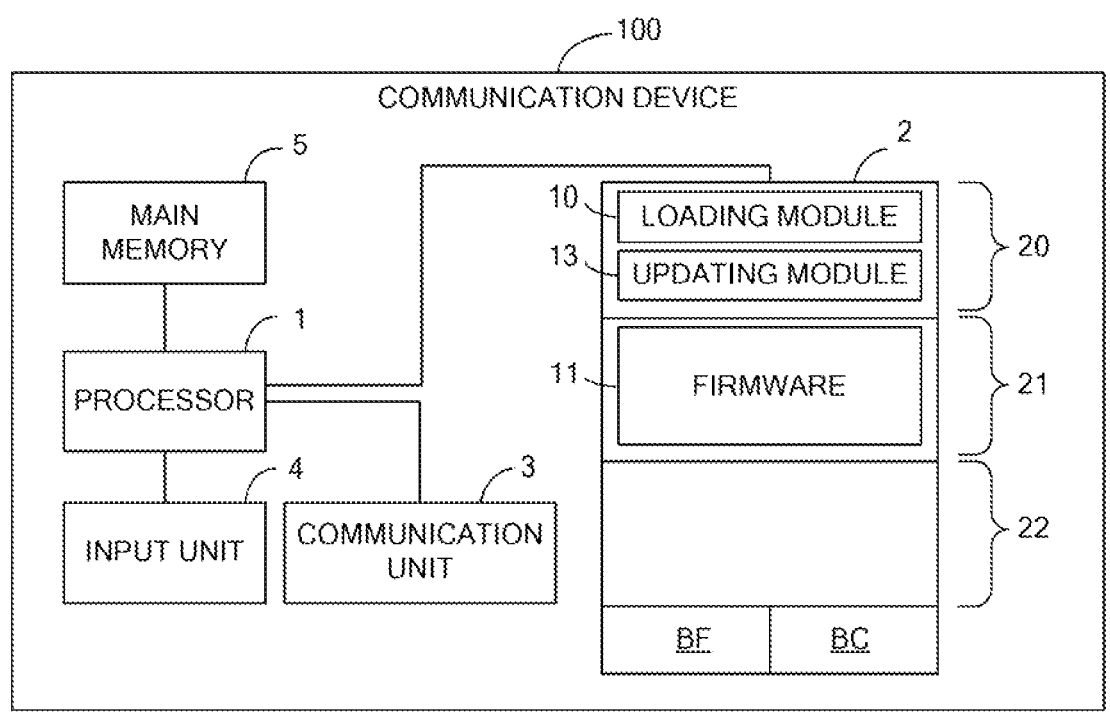
FIG. 1A is a block diagram of an embodiment of a communication device, the communication device including an updating module and a loading module as separate modules within a non-volatile memory.

Each illustrative module listing below may be a computer executable program or a circuit. FIG. 1A is a block diagram of an embodiment of a communication device 100. The embodiment of the communication device 100 comprises a processor 1, a non-volatile memory 2, a communication unit 3, an input unit 4, and a main memory 5.

The memory 2 may be a flash memory or an electrically erasable programmable read-only memory (EEPROM). The memory 2 of FIG. 1A is a simplified illustrative diagram and may comprise one or more memory chips in practice.

The communication unit 3 is utilized to transmit and receive information data. The input unit 4 may comprise a switch to power on or power off the communication device 100. The communication device 100 may comprise an operating system, application programs, configuration parameters and/or any other information data.

In this embodiment, the memory 2 is divided into three areas: a holding area 20, a first partition 21, and a second partition 22. The loading module 10 of the communication device 100 is stored in the holding area 20, and an original firmware is stored in the first partition 21. The second partition 22 may be utilized to store a new firmware. The memory 2 comprises two flags, BF and BC. The BF flag is utilized to indicate a boot firmware for the communication device, and the BC flag is utilized to indicate whether to do bootability check. The area where a boot firmware is stored is referred to as a primary area, and the area for storing a new firmware is called a backup area. In this embodiment, when the BF flag is set to "0", the first partition 21 is taken as the primary area of the memory, when the BF flag is set to "1", the second partition 22 is taken as the primary area, and when one partition is taken as the primary area, the other of the two partitions is taken as the backup area.

In alternative embodiments, identifying the primary area as being partition 21 or 22 may be based on a memory address stored in the BF flag or any other information. The memory address may be a start address of the partition 21 or 22, or a start address of firmware. The BF and BC flags may comprise one bit respectively, but are not limited thereto.

Figure 1B:
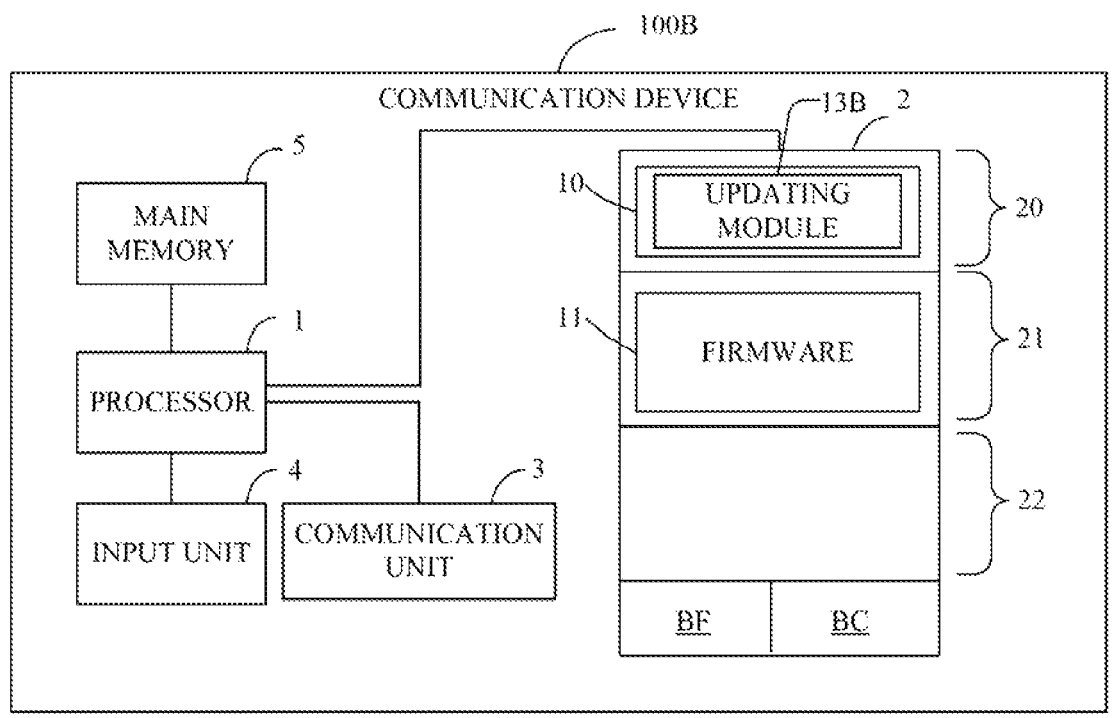
FIG. 1B is a block diagram of another embodiment of a communication device, wherein the updating module is integrated into the loading module in the non-volatile memory.
Figure 1C:
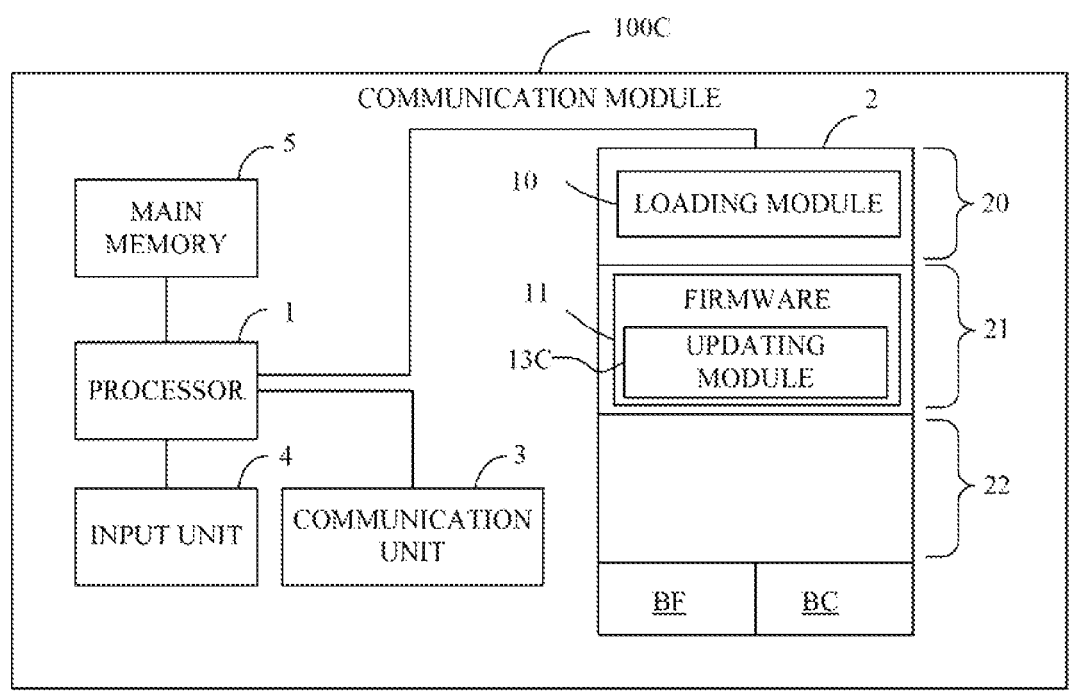
FIG. 1C is a block diagram of another embodiment of a communication device, wherein the updating module is integrated into a firmware in the non-volatile memory.
Figure 1D:
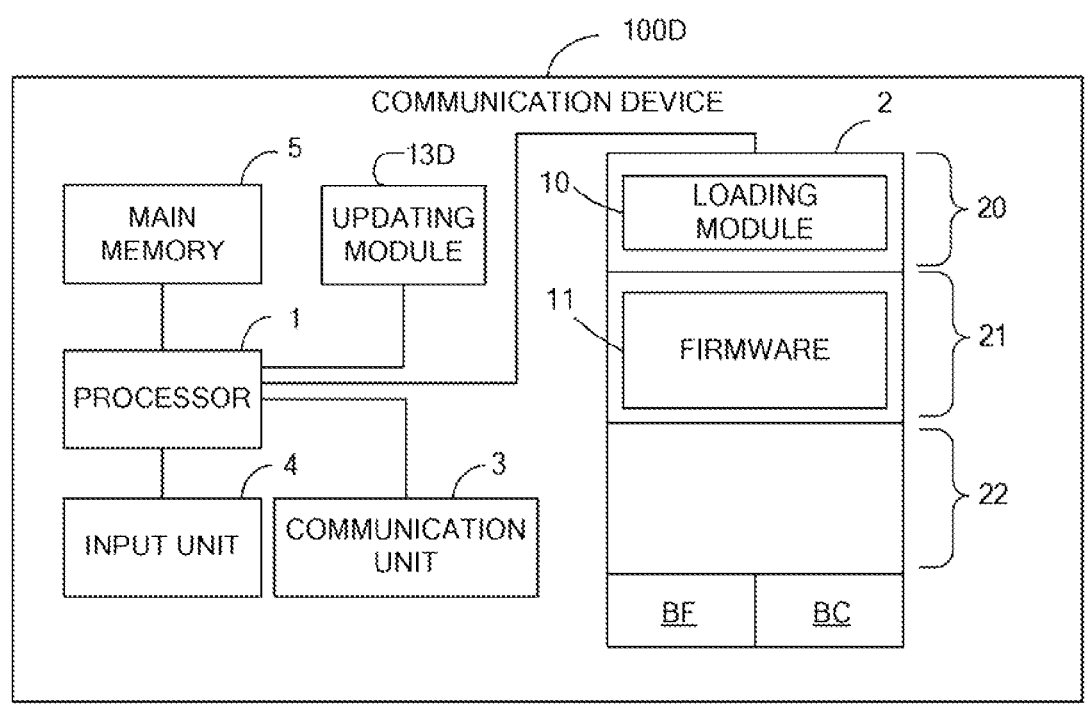
FIG. 1D is a block diagram of another embodiment of a communication device, wherein the updating module is stored independently of the non-volatile memory in the communication device.

The communication device 100 further comprises an updating module 13 utilized to receive new firmware outside the communication device 100 and store the new firmware in the backup area of the memory 2, such as the second partition 22. If an older version of firmware has been stored in the backup area, the new firmware may overwrite the older version of firmware. The updating module 13 may be integrated into the loading module 10 or any firmware (such as firmware 11), or stored anywhere independently in the memory 2. Communication devices 100B, 100C and 100D respectively in FIGS. 1B, 1C, and 1D are different embodiments of the communication device 100. Updating modules 13B, 13C and 13D are alternative embodiments of the updating module 13. In these alternative embodiments, the updating module 13B in FIG. 1B is integrated into the loading module 10, the updating module 13C in FIG. 1C is integrated into firmware 11, and the updating 13D in FIG. 1D is stored independently in the communication device 100D. After the storing of the new firmware is completed, the updating module 13 utilizes the BF flag to assign the new firmware as the boot firmware, and utilizes the BC flag to indicate whether to do the bootability check.

The loading module loads the firmware assigned by the BF flag when booting the communication device 100.

Figure 2:
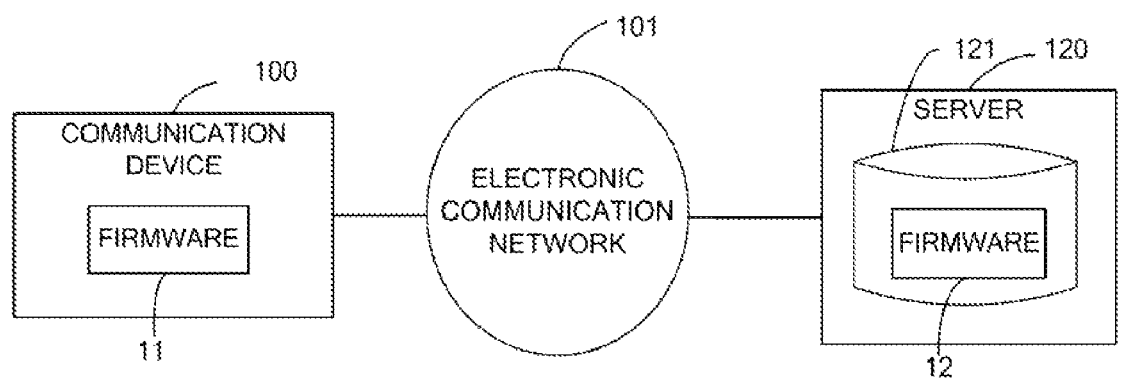
FIG. 2 is a schematic diagram of a communication device and a server.

The communication device 100 may comprise any consumer premise equipment, as well as integrated access devices such as set-top boxes, digital subscriber line (DSL) modems, cable modems and so on. The communication device 100 may communicate with another communication device and download firmware from a server. With reference to FIG. 2, the communication device 100 connects to a server 120 through electronic communication network 101. The server 120 stores a plurality of firmware in a database 121. The communication device 100 may download the new firmware from the server 120. A greater detail of the firmware updating procedure of the communication device 100 is shown below.

Figure 3:
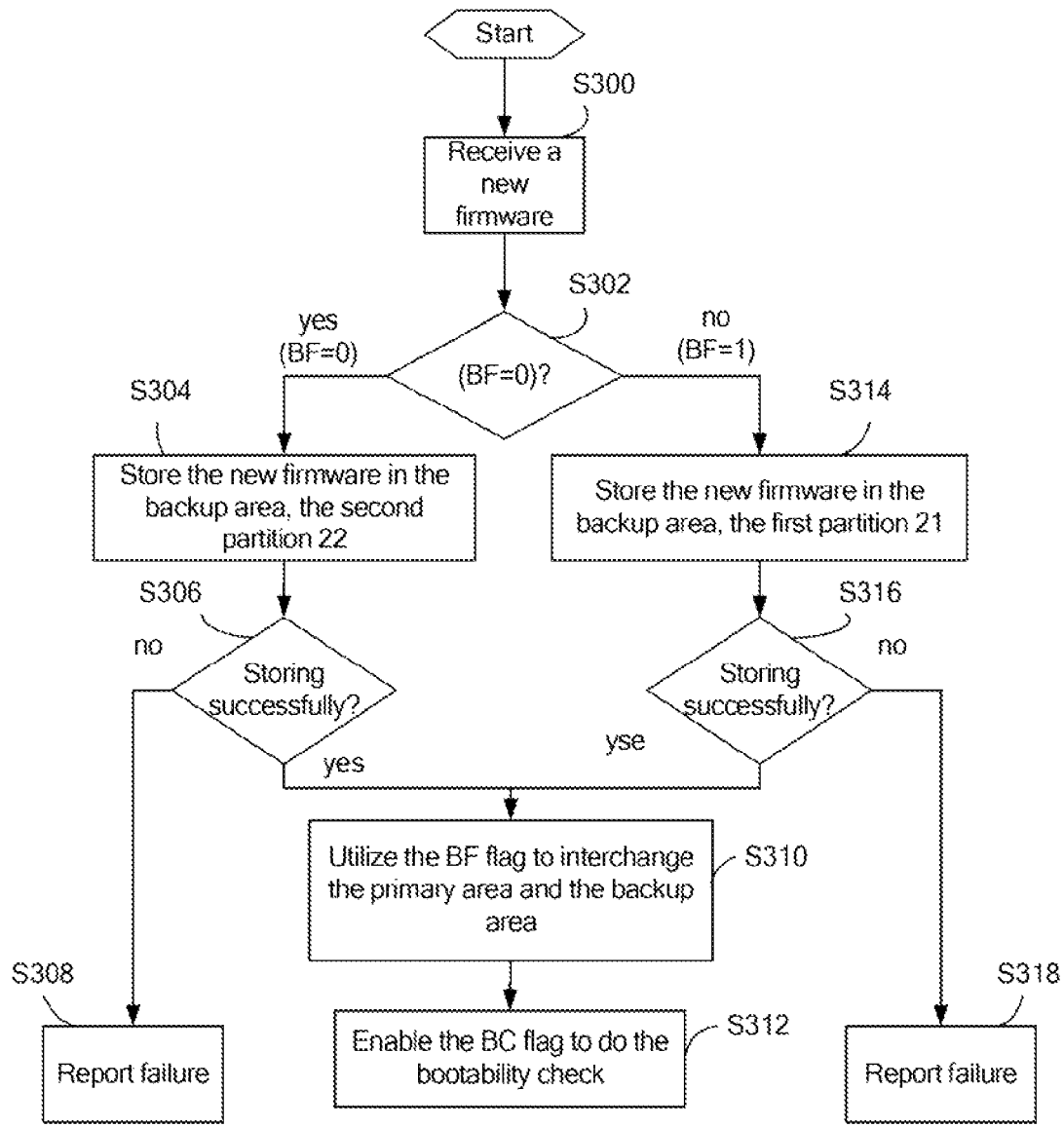
FIG. 3 is a flowchart of updating firmware of a communication device.

With reference to FIG. 3, the updating module 13 in the communication device 100 first receives new firmware 12 from the server 120 (step S300) and determines whether the primary area referred to by the BF flag is the first partition 21 or the second partition 22 (step S302). If the primary area is the first partition 21, the updating module 13 stores the new firmware 12 in the backup area, which is the second partition 22 (step S304). If the primary area is the second partition 22, the updating module 13 stores the new firmware 12 in the backup area, which is the first partition 21 (step S314).

In step S306, the updating module 13 determines whether the storing of the new firmware 12 is successful. The updating module 13 marks and reports a failure on the firmware update in the backup area if the storing of the new firmware 12 is not successful. The updating module 13 utilizes the BF flag to change the primary area and the backup area (step S310) and utilizes the BC flag to enable the bootability check (step S312) if the storing of the new firmware 12 is successful. For example, the value 1 of the BC flag means the bootability check is enabled, and the value 0 of the BC flag means the bootability check is disabled. However, the BC flag may utilize different information to indicate whether to do the bootability check. Finally, the updating module 13 finishes firmware updating.

In step S316, the updating module 13 determines whether the storing of the new firmware 12 is successful. The updating module 13 marks and reports a failure on the firmware update if the storing of the new firmware 12 is not successful. Steps S310 and S312 are executed if the storing of the new firmware 12 is successful.

Figure 4:
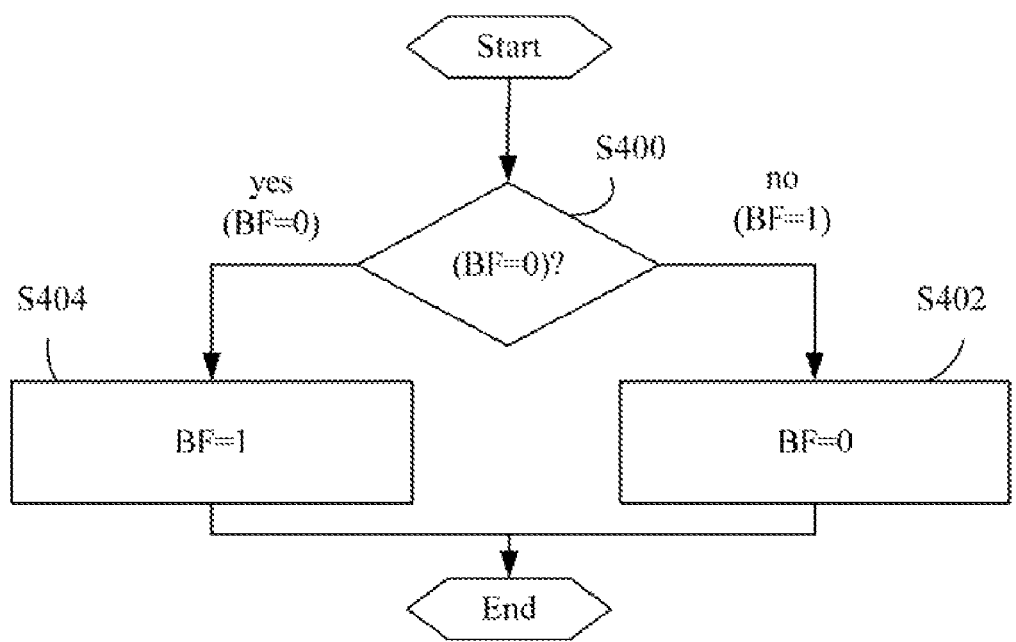
FIG. 4 is a flowchart of changing designations of partitions from primary area to backup area of a communication device or vice versa as applicable.

An exemplary process of changing the primary area and the backup area is shown in FIG. 4. First, the value of the BF flag is determined (step S400). When the value of the BF flag is 0, the value of the BF flag is modified to 1 (step S404). When the value of the BF flag is 1, the value of the BF flag is modified to 0 (step S402).

Figure 5:
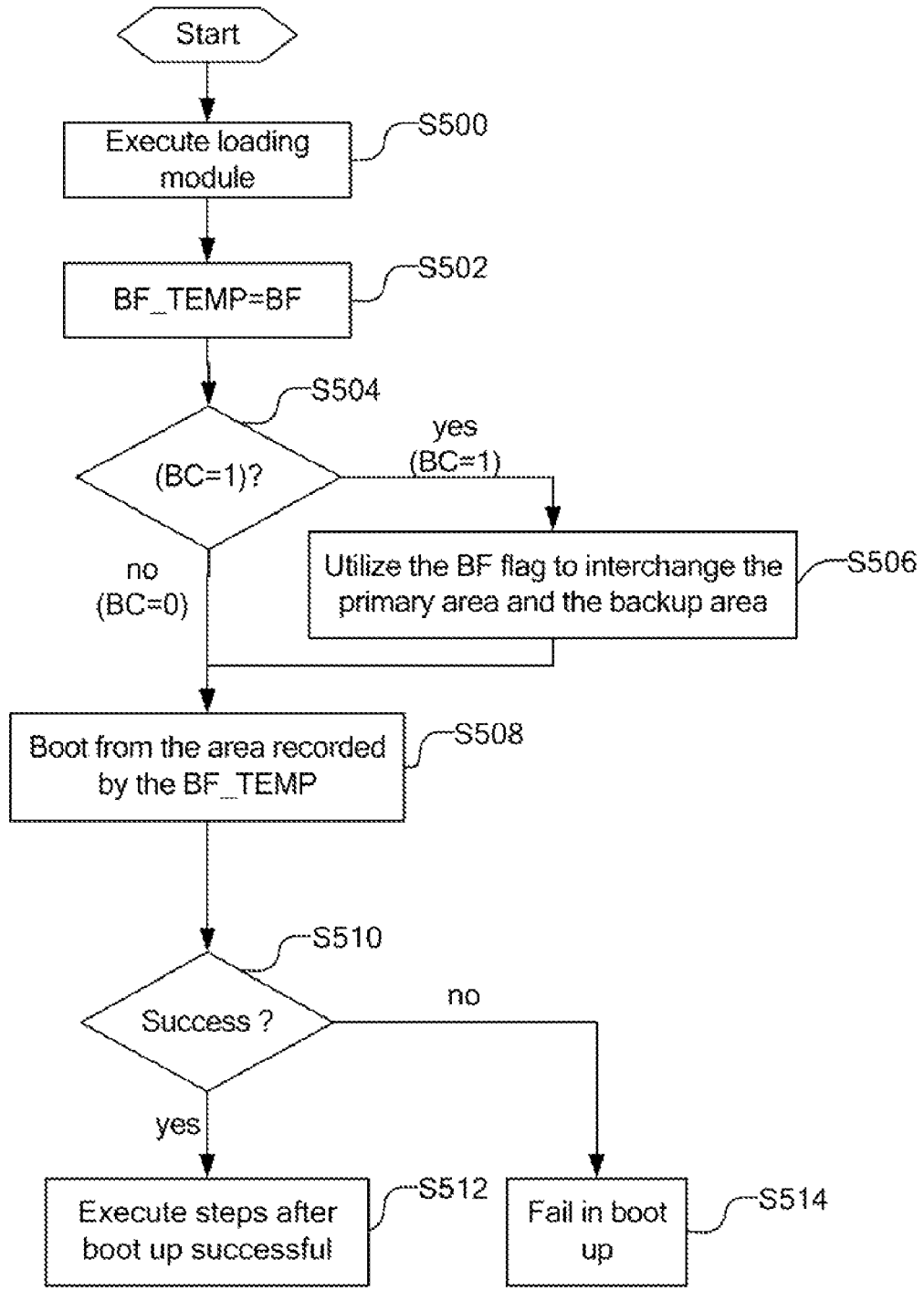
FIG. 5 is a flowchart showing operations of a loading module of a communication device.
Figure 6:
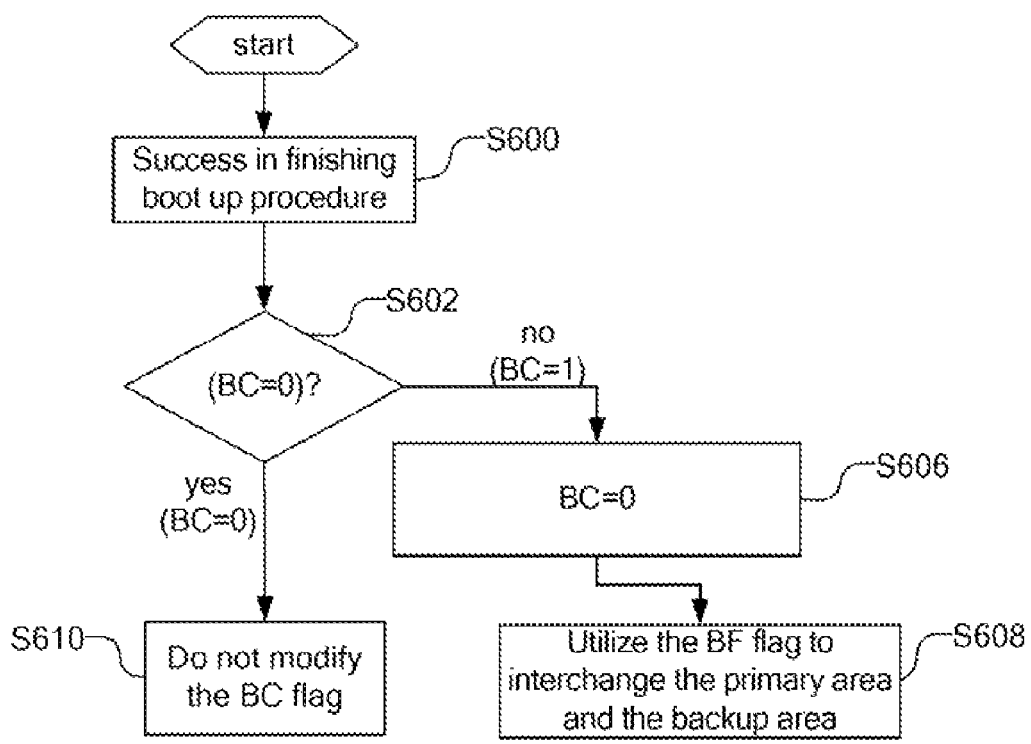
FIG. 6 is a flowchart of interchanging a primary area and a backup area after a successful boot up procedure.

The communication device 100 reboots in response to operation of the input unit 4. With reference to FIG. 5 and FIG. 6, while the communication device 100 boots, the processor 1 executes the loading module 10 to proceed with subsequent steps (step S500). The loading module 10 identifies the boot firmware based on the BF flag. In step S502, the loading module 10 utilizes a parameter, hereinafter referred to as BF_TEMP, to record the value of the BF flag (step 502), and determines whether to do the ability check based on the BC flag. In the embodiment, the partition number currently recorded in BF_TEMP is 1, i.e., the second partition 22. In step S504, the loading module 10 determines whether the BC flag shows enabled state of the bootability check (BC=1). If the value of the BC flag is 0, the loading module 10 directly executes step S508. If the value of BC flag is 1, the loading module 10 interchanges the primary area and the backup area (step S506) and executes step S508. In step S508, the loading module 10 loads and executes the firmware stored in the area indicated by the parameter BF_TEMP to execute a subsequent boot procedure (step S508). In the embodiment, the firmware that has been loaded and executed is the new firmware 12. If the executed firmware completes the boot procedure successfully, the firmware executes subsequent steps shown in FIG. 6. If the firmware does not complete the boot procedure and causes device boot failure, the communication device 10 may reboot in response to operation of the input unit 4 (step S514).

If the communication device 100 reboots after step S514, because a primary area and a backup area have been switched over in step S506, processor 1 loads and executes an original firmware 11 instead of the new firmware 12.

In step S510 of FIG. 5, if the new firmware 12 is executable and causes the communication device 100 to satisfy a predetermined boot up condition, the communication device 100 determines the new firmware functions accurately. For example, the predetermined boot up condition comprises a plurality of specific tasks. While executing the new firmware 12, the processor 1 determines whether the plurality of specific tasks have been loaded into the main memory 5 of the communication device 100. If the plurality of specific tasks have been loaded, the determination is made that the communication device 100 passes the bootability check and boots up successfully. The plurality of specific tasks are a plurality of modules or processes that provide specific functions for the communication device 100, such as functions of handling command line, hypertext transfer protocol (HTTP), dynamic host configuration protocol (DHCP), telnet, system log, network address translation (NAT) or universal plug and play protocol (UPNP). The communication device 100 may receive a request from a remote server, and in response to the request, allow the remote server to set a configuration of the communication device 100. The functions provided by the plurality of specific tasks further comprise functions for interacting with the remote server, such as user authentication, data transmission, decryption, encryption, and so on.

In FIG. 6, the firmware 12 keeps on running after completing the boot procedure successfully (step S600) and determines whether the bootability check is still enabled. In step S602, the determination is made that whether the value of the BC flag equals to 0 (step S602). If the value of the BC flag equals to 0, the value of the BC flag does not need to be changed (step S610). If the value of the BC flag does not equal to 0, the value of the BC flag is modified to 0, the bootability check is changed from the enabled to a disabled state (step S606), and the primary area and the backup area are interchanged again (step S608).

In the embodiment, if the new firmware 12 completes the boot procedure successfully, in step S608, the second partition 22 storing the new firmware 12 is referred to as the primary area again. If the communication device 100 reboots after step S608, because the primary area and the backup area have been switched over in step S608, the processor 1 loads and executes the new firmware 12 instead of the original firmware 11. If the new firmware 12 functions abnormally, step S608 is not executed, the communication device 100 keeps the value of the BC flag as 0, and the first partition 21 where the firmware 11 is stored is still the primary area.

According to the above illustration, before determining whether the new firmware 12 functions accurately, the loading module 10 utilizes the BF flag to assign the original firmware 11 or a firmware other than the new firmware as the boot firmware, loads and executes the new firmware 12 in response to a boot procedure of the communication device. If three or more firmware are stored in the memory 2, before determining whether the new firmware 12 functions accurately, the loading module 10 may utilize the BF flag to assign any firmware other than the new firmware 12 as the boot firmware, load and execute the new firmware 12 in response to a boot procedure of the communication device 100.

Figure 7:
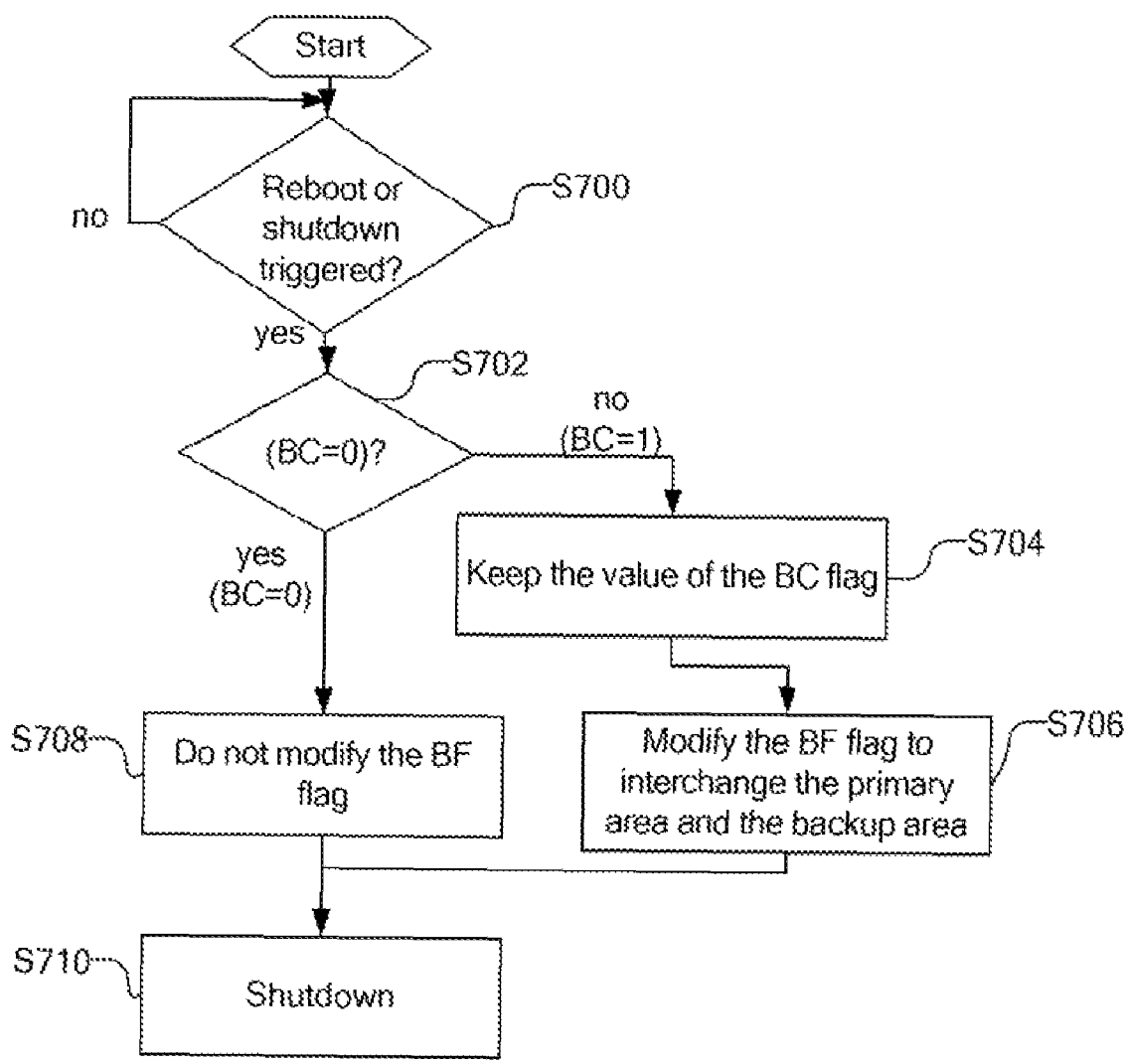
FIG. 7 is a flowchart for interchanging a primary area and a backup area in order to prevent any error that may be caused by a reboot demand before a successful boot up procedure.

The following exemplary example is illustrated to prevent reboot of the communication device 100 by action of the input unit 4, or any other related reboot preventions, before completion of S608 in FIG. 6, which may cause errors. In FIG. 7, the processor 1 detects whether the communication device 100 is triggered to reboot or shut down (step S700). The processor 1 executes subsequent steps in response to the triggering event if the communication device is triggered to reboot or shut down. The processor 1 determines whether the bootability check is enabled. In step S702, the determination is made that whether the value of the BC flag equals to 0 (step S702). If the value of the BC flag is 0, which means the bootability check is disabled, and the value of the BF flag does not need to be modified (step S708). If the value of the BC flag is 1, which means the bootability check is enabled, the value of the BC flag is kept as 1 (step S704), and the value of the BF flag is modified to execute the interchange of the primary area and the backup area (step S706). Finally, the communication device reboots or shuts down (step S710). Thus, the new firmware can undergo the bootability check after reboot of the communication device.

The communication device 100 may include a backup power supply to ensure execution of the steps FIG. 7 in the event of a power failure.

According to the previous description, before the communication device 100 executes new firmware 12 and determines whether the new firmware 12 can function accurately, the communication device 100 utilizes the BF flag to assign an older version firmware 11 other than the new firmware 12 as the boot firmware. Thus, if the new firmware 12 is faulty and causes the communication device 100 to malfunction, after the communication device 100 reboots, the communication device 100 can utilize the older version firmware 11 assigned by the BF flag to boot up without further operation of changing boot configuration of the communication device 100.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A communication device, comprising:
   a non-volatile memory comprising a first flag indicating boot firmware for the communication device, a second flag indicating whether a bootability check is to be executed, and a first data area storing original firmware of the communication device;
   an updating module configured for receiving and storing new firmware in a second data area of the non-volatile memory, utilizing the first flag to assign the new firmware as the boot firmware, and utilizing the second flag to enable the bootability check after the storing of the new firmware is completed; and
   a loading module configured for utilizing the first flag to assign a firmware version other than the new firmware as the boot firmware before verification of the new firmware, and loading and executing the new firmware in response to a boot up procedure of the communication device;
   wherein if the new firmware is executable and causes the communication device to satisfy a predetermined boot up condition, the communication device determines that the new firmware passes the bootability check, and modifies the value of the first flag to assign the new firmware as the boot firmware; and if the new firmware does not pass the bootability check, the communication device keeps the value of the first flag unchanged.

2. The communication device as described in claim 1, wherein the first and the second data areas are different partitions of the non-volatile memory.

3. The communication device as described in claim 1, wherein determination of whether the communication device satisfies the predetermined boot up condition is based on whether the new firmware successfully initialize a number of expected software processes, wherein if the new firmware successfully initialize the expected software processes, determination is made that the communication device satisfies the predetermined boot up condition, or if the new firmware does not successfully initialize the expected software processes, determination is made that the communication device does not satisfy the predetermined boot up condition.

4. The communication device as described in claim 3, wherein the expected software processes include one or more software processes each providing at least one function selected from the group consisting of a command line, hypertext transmission protocol, dynamic host configuration protocol, telnet, system log, network address translation, and universal plug and play protocol.

5. The communication device as described in claim 3, wherein one of the expected software processes is configured for receiving a request from a remote server, and allowing the remote server to set configuration of the communication device.

6. The communication device as described in claim 1, wherein if the new firmware passes the bootability check, the new firmware modified the second flag to disable subsequent bootability checks.

7. The communication device as described in claim 6, wherein the communication device detects whether the communication device is triggered to reboot or shutdown, and further determines whether the bootability check is enabled if the communication device is triggered to reboot or shutdown, the communication device modifies the value of the first flag to assign the new firmware as the boot firmware before the communication device reboots or shuts down if the bootability check is enabled, or keeps the value of the first flag unchanged before the communication device reboots or shuts down if the bootability check is disabled.

8. The communication device as described in claim 7, further comprising a backup power supply providing electrical power to the communication device for operation after the triggering of the reboot or shutdown is detected.

9. The communication device as described in claim 1, wherein the non-volatile memory is a flash memory.

10. A method for updating firmware executed in a communication device comprising a non-volatile memory, the non-volatile memory comprising a first flag indicating boot firmware for the communication device, a second flag indicating whether a bootability check is to be executed, and a first data area storing original firmware for the communication device, comprising:
   receiving and storing new firmware in a second data area of the non-volatile memory;
   utilizing the first flag to assign the new firmware as the boot firmware, and utilizing the second flag to enable the bootability check after the storing of the new firmware is completed; and
   utilizing the first flag to assign a firmware version other than the new firmware as the boot firmware before determining whether the new firmware passing the bootability check; and loading and executing the new firmware in response to a boot procedure of the communication device;

wherein in response to the new firmware being executable and causing the communication device to satisfy a predetermined boot up condition, the communication device determines that the new firmware passes the bootability check, and modifies the value of the first flag to assign the new firmware as the boot firmware; or if the new firmware does not pass the bootability check, the communication device keeps the value of the first flag unchanged.

11. The method as described in claim 10, wherein the determination of whether the communication device satisfies said predetermined boot up condition comprises:
   determining whether the new firmware successfully initialize a number of expected software processes;
   determining that the communication device satisfies the predetermined boot up condition if the new firmware successfully initialize the expected software processes; or
   determining that the communication device does not satisfy the predetermined boot up condition if the new firmware does not successfully initialize the expected software processes.

12. The method as described in claim 11, wherein the expected software processes include one or more software processes each providing at least one function selected from the group consisting of a command line, hypertext transmission protocol, dynamic host configuration protocol, telnet, system log, network address translation, and universal plug and play protocol.

13. The method as described in claim 11, wherein one of the expected software processes is configured for receiving a request from a remote server, and allowing the remote server to set configuration of the communication device.

14. The method as described in claim 10, further comprising:
   modifying the second flag to disable subsequent bootability check if the new firmware passes the bootability check.

15. The method as described in claim 14, further comprising:
   detecting whether the communication device is triggered to reboot or shutdown;
   determining whether the bootability check is enabled if the communication device is triggered to reboot or shutdown;
   modifying the value of the first flag to assign the new firmware as the boot firmware before the communication device reboots or shuts down if the bootability check is enabled; or
   keeping the value of the first flag unchanged before the communication device reboots or shuts down if the bootability check is disabled.

16. The method as described in claim 15, further comprising:
   utilizing a backup power supply of the communication device to provide electrical power to the communication device for operation after the triggering of the reboot or shutdown is detected.

17. A method for updating firmware, executed in a communication device equipped with a non-volatile memory storing original firmware of the communication device in a first data area of the non-volatile memory, comprising:
   utilizing a first flag to indicate boot firmware for the communication device and a second flag indicating whether a bootability check is to be executed;
   receiving and storing new firmware in a second data area of the non-volatile memory;
   utilizing the second flag to enable the bootability check after the storing of the new firmware is completed;
   the bootability check further comprises:
   utilizing the first flag to assign a firmware version other than the new firmware as the boot firmware for the communication device before determining whether the new firmware passes the bootability check;
   loading and executing the new firmware in response to a boot procedure of the communication device;
   determining that the new firmware passes the bootability check and modifying the value of the first flag to assign the new firmware as the boot firmware if the new firmware is executable and causes the communication device to satisfy a predetermined boot up condition; or
   keeping the value of the first flag unchanged if the new firmware does not pass the bootability check.

18. The method as described in claim 17, further comprising:
   if the new firmware passes the bootability check, modifying the second flag by the new firmware to disable subsequent bootability checks.

19. The method as described in claim 17, wherein determination of whether the communication device satisfies the predetermined boot up condition is based on whether the new firmware successfully initialize a number of expected software processes, wherein if the new firmware successfully initialize the expected software processes, determination is made that the communication device satisfies the predetermined boot up condition, or if the new firmware does not successfully initialize the expected software processes, determination is made that the communication device does not satisfy the predetermined boot up condition.

20. The method as described in claim 19, wherein the expected software processes include one or more software processes each providing at least one function selected from the group consisting of a command line, hypertext transmission protocol, dynamic host configuration protocol, telnet, system log, network address translation, and universal plug and play protocol.

* * * * *